United States Patent [19]

Takeuchi

[11] Patent Number: 4,804,421
[45] Date of Patent: Feb. 14, 1989

[54] METHOD AND APPARATUS FOR REMOVING AGED WAX AND FUR ON VEHICLE

[75] Inventor: Shigeo Takeuchi, Nagoya, Japan

[73] Assignee: Takeuchi Tekko Kabushiki Kaisha, Aichi, Japan

[21] Appl. No.: 159,083

[22] Filed: Feb. 23, 1988

[30] Foreign Application Priority Data

Feb. 27, 1987 [JP] Japan ................................. 44428/87

[51] Int. Cl.$^4$ .............................................. B08B 7/04
[52] U.S. Cl. ..................................... 134/18; 134/254; 134/40; 134/123; 134/172
[58] Field of Search ..................... 134/25.1, 25.2, 172, 134/56 R, 21, 26, 27, 40, 173, 123, 18

[56] References Cited

U.S. PATENT DOCUMENTS 4,622,246 11/1986 Takeuchi ............................ 427/327
5,701,356 10/1972 Hanna et al. ....................... 134/113

Primary Examiner—H. M. S. Sneed
Assistant Examiner—Sharon T. Cohen
Attorney, Agent, or Firm—Armstrong, Nikaido Marmelstein & Kubovcik

[57] ABSTRACT

In a method for removing an aged wax and fur on a vehicle by a washing machine including a gate-type frame which is reciprocally travellable astride the vehicle in longitudinal direction of the latter and which is provided with a rotary brush arrangement, a dryer, a clear water sprayer, a neutralizer-containing rinse water sprayer and an aged-wax/fur removing material spreader, the vehicle is brushed by the rotary brush arrangement during a first advancing movement of the gate-type frame, and an aged-wax/fur removing material is spreaded onto the vehicle by the aged-wax/fur removing material spreader, while at the same time brushing the vehicle by said rotary brush arrangement during a first returning movement and second advancing movement of the gate-type frame. Then, the vehicle is brushed by the rotary brush arrangement during a second returning movement of the gate-type frame, and then the gate-type frame is put out of operation for a given period of time to perform a readjustment of the brushing for such cessation period. During a subsequent third advancing movement of the gate-type frame, a neutralizer-containing rinse water is sprayed onto the vehicle by the neutralizer-containing rinse water sprayer, while brushing the vehicle by the rotary brush arrangement, and clear water is then sprayed onto the vehicle by the clear water sprayer. Further, during a third returning movement of the gate-type frame, clear water is sprayed onto the vehicle by the clear water sprayer and then, the vehicle is dried by said dryer.

3 Claims, 5 Drawing Sheets

METHOD AND APPARATUS FOR REMOVING AGED WAX AND FUR ON VEHICLE

BACKGROUND OF THE INVENTION

1. Field of the Invention

The present invention relates to a method and apparatus for mechanically removing an aged-wax and fur firmly deposited on a coated surface of a vehicle without substantially requiring person's hands.

As used in the present invention, "aged wax" means waxes aged and stained with dirts in the air or rainwater taken into a wax layer which has been previously applied as a thin coated protective film on a surface of a vehicle, and "fur" means organic materials such as calcium dissolved into water, having been deposited on and penetrated into the vehicle surface, and having emerged again in a darkened form thereonto.

2. Description of the Prior Art

When the coated surface of a vehicle is to be newly waxed for protection and polishing, a color inherent in a coating is difficult to display by merely providing a new waxing on the coated surface with the aged wax and the fur having been left thereon. There is conventionally known the use, for the purpose of mechanically removing the aged wax and the fur, of a removing apparatus including a gate-type frame which is reciprocally travellable astride a vehicle in longitudinal directions of the latter and which is proivided with a rotary brush arrangement, a dryer, a clear water sprayer, a neutralizer-containing rinse water sprayer and an aged-wax and fur removing material spreader, as described in Japanese Patent Application Laid-open No. 157456/86.

With the prior art apparatus, the vehicle is brushed during first advancing and returning movements of the gate-type frame to remove dirts on the vehicle, and an aged-wax and fur removing material is spreaded onto the vehicle and rubbed into the surface of the vehicle by brushing to liberate the dirts during second advancing and returning movements. Further, during third advancing and returning movements, only the brushing is continued to enhance an effect of liberating the fur and the aged wax, and during fourth advancing and returning movements, clear water is sprayed onto the vehicle for rinsing thereof, followed by drying of the surface thereof. This prior art apparatus is accompanied by the following problems. It is necessary to move the gate-type frame in four reciprocations for completion of all the steps, resulting in a decreased efficiency. Moreover, during the fourth advancing movement, the spraying of the neutralizer-containing rinse water onto the vehicle is not conducted prior to the brushing and hence, an effect by a neutralizer therein cannot be satisfactorily enhanced by brushing. Additionally, because the step of rinsing with clear water after spraying of the neutralizer-containing rinse water is conducted only during the fourth returning movement, a rinsing effect is not satisfactory.

SUMMARY OF THE INVENTION

The present invention has been attained with the above circumstances in view, and it is an object of the invention to provide a method and apparatus for removing an aged wax and fur on a vehicle, wherein the problems associated with the prior art apparatus can be overcome.

To accomplish the above object, in a first aspect of the present invention, there is provided a method for removing an aged wax and fur on a vehicle by a washing machine including a gate-type frame which is reciprocally travellable astride the vehicle in longitudinal directions of the latter and which is provided with a rotary brush arrangement, a dryer, a clear water sprayer, a neutralizer-containing rinse water sprayer and an aged-wax/fur removing material spreader, comprising the steps of: brushing the vehicle by the rotary brush arrangement during a first advancing movement of the gate-type frame; spreading an aged-wax/fur removing material onto the vehicle by the aged-wax/fur removing material spreader, while at the same time brushing the vehicle by the rotary brush arrangement during a first returning movement and second advancing movement of the gate-type frame; brushing the vehicle by the rotary brush arrangement during a second returning movement of the gate-type frame; putting the gate-type frame out of operation for a given period of time to perform a readjustment of the brushing during the period of out-of-operation; spraying a neutralizer-containing rinse water onto the vehicle by the neutralizer-containing rinse water sprayer, while brushing the vehicle by the rotary brush arrangement, and then spraying clear water onto the vehicle by the clear water sprayer, during a subsequent third advancing movement of the gate-type frame; and spraying clear water onto the vehicle by the clear water sprayer and then drying the vehicle by the dryer during the third returning movement of the gate-type frame.

Further, in a second aspect of the present invention, there is provided an apparatus for removing an aged-wax and fur on a vehicle, comprising as components: a gate-type frame reciprocally travellable astride the vehicle in longitudinal directions of the latter; a rotary brush arrangement mounted on the gate-type frame for brushing the vehicle; first and second aged-wax/fur removing material spreaders mounted on the frame for spreading an aged-wax/fur removing material in a bubbled form onto the vehicle; a neutralizer-containing rinse water sprayer mounted on the frame for spraying a neutralizer-containing rinse onto the vehicle; a clear water sprayer mounted on the frame for spraying clear water onto the vehicle; a dryer mounted on the frame for drying the vehicle; and a control device for controlling the travelling of the frame and the operation of the individual components, the first and second aged-wax/fur removing material spreaders being arranged in front and rear of the rotary brush arrangement to sandwich the latter therebetween, the neutralizer-containing rinse water sprayer and the dryer being disposed at front portions of the gate-type frame, respectively, and the clear water sprayer being disposed at a rear portion of the gate-type frame.

According to the present invention, a prewashing step, an aged-wax and fur removing step, a neutralizing step, a rinsing step and a drying step can be successively conducted through strokes in mere three reciprocations of the gate-type frame and through a simple readjustment effected during a cessation period given in the course of such strokes. Therefore, the aged-wax and the fur can be mechanically removed without substantially requiring person's hands and within an extremely short time, and this largely contributes to an increase in working efficiency. In addition, particularly since the neutralizer-containing rinse water sprayed onto the vehicle during the third advancing movement can be satisfactorily rubbed onto the vehicle by brushing, an effect by a neutralizer therein can be enhanced. Further, since the rinsing step using clear water following the spraying of the neutralizer-containing rinse water is conducted for a long period over the strokes in one reciprocation provided by the third advancing and returning movements, a rinsing effect can also be enhanced.

Further according to the present invention, in carrying out the rinsing step over the strokes in one reciprocation provided by the third advancing and returning movements, the clear water sprayer at the rear portion of the gate-type frame can be commonly used. Therefore, each of the sprayers is simplified in construction and also easy to control.

The above and other objects, features and advantages of the invention will become apparent from reading of the following description of the preferred embodiments taken in conjunction with the accompanying drawings.

BRIEF DESCRIPTION OF THE DRAWINGS

The drawings illustrating one embodiment of the present invention will be described below in brief.

DESCRIPTION OF THE PREFERRED EMBODIMENT

Figure 1:
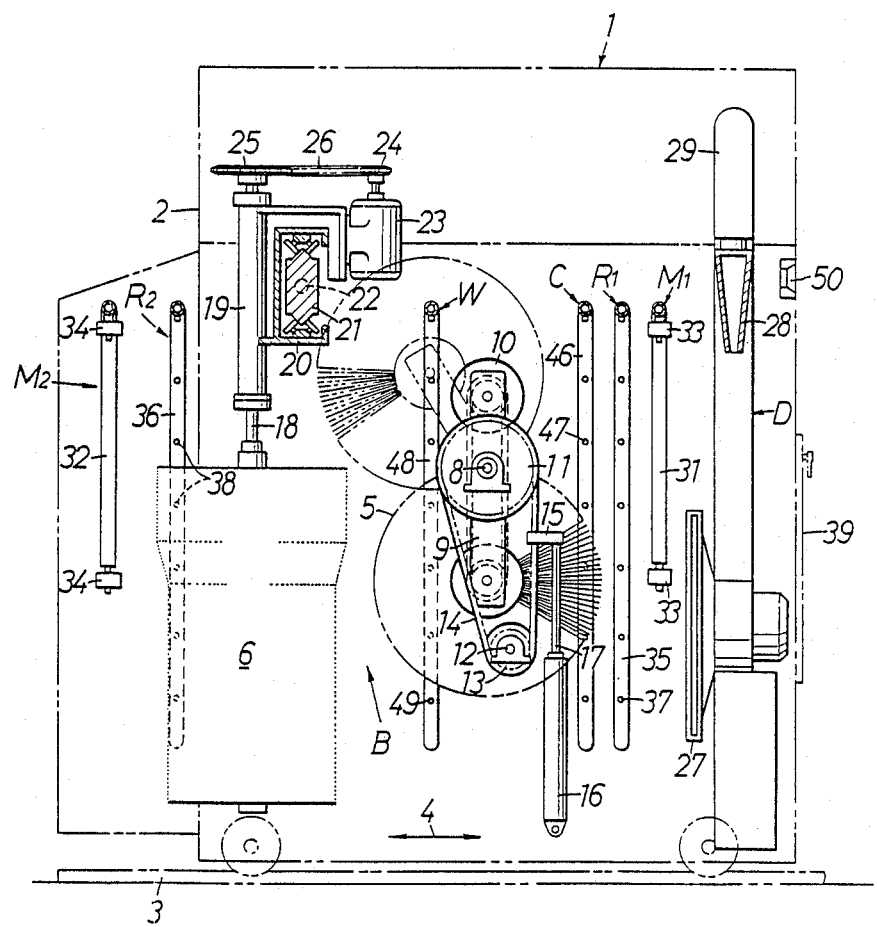
FIG. 1 is a side view in longitudinal section of a washing machine.

The present invention will now be described by way of one embodiment with reference to the accompanying drawings. Referring first to FIG. 1, a car washing machine 1 comprises a gate-type or portal frame 2 mounted to straddle a vehicle which is not shown. The gate-type frame 2 is travellable along travel rails 3 laid on the ground sideways of the vehicle, i.e., travellable in oppsoite directions indicated by an arrow 4 longitudinally with respect to the vehicle. As used in this description, "front side" of the gate-type frame 2 means a front side in an advancing direction (right side as viewed in FIG. 1), and "rear side" means a rear side in the advancing direction (left side as viewed in FIG. 1).

The gate-type frame 2 is provided with a rotary brush arrangement B, a dryer D, a cleaner spraying device C, and a wax applicator W, these components serving to fulfil functions conventionally possessed by the washing machine 1, i.e., process functions such as washing, wax applicating, and drying functions.

The rotary brush arrangement B includes a rotary brush 5 for a vehicle upper surface and a pair of rotary brushes 6 for side surfaces. The upper surface rotary brush 5 is swingably supported through a swingable arm 9 on a transverse shaft 8 rotatably supported on the gate-type frame 2. A motor 10 is mounted on the swingable arm 9 at its upper portion, so that the upper surface rotary brush 5 is driven for rotation for the motor 10 through a transmission mechanism within the swingable arm 9. In addition, a sprocket 11 is fixedly mounted on the transverse shaft 8, and an intermediate shaft 12 is rotatably supported on the gate-type frame 2 below the transverse shaft 8 and has another sprocket 13 fixedly mounted thereon. An endless chain 14 is passed around both the sprockets 11 and 13, and a piston rod 17 in an air cylinder 16 supported at its lower end on the gate-type frame 2 is connected to a fitting 15 secured to the chain 14 at a midway thereof. Thus, if the air cylinder 16 is driven for contraction, the upper surface rotary brush 5 can be held at an upper retracted position, as shown by a two-dot chain line. On the other hand, if the air cylinder 16 is brought into an inoperative condition, the rotary upper surface brush 5 can be freely swung back and forth with respect to the gate-type frame 2 about the transverse shaft 8.

Each of the pair of the side surface rotary brushes 6 has a rotary shaft 18 held on a cylindrical holder 19 which is secured to a movable frame 20 with its axis being vertical. The movable frame 20 is in slidable engagement with a guide rail 21, which is transversely suspended on the gate-type frame 2, and has a support shaft 22 rotatably carried on the gate-type frame 2. Thus, the guide rail 21, the movable frame 20, the cylindrical holder 19, the rotary shaft 18 and the side surface rotary brush 6 are swingable about the support shaft 22 in a travelling direction 4. A motor 23 is carried on the movable frame 20, and an endless chain 26 is passed around a sprocket 24 fixedly mounted on an output shaft of the motor 23 and a sprocket 25 fixedly mounted on an end of the rotary shaft 18, so that the rotary side surface brush 6 may be driven for rotation by the motor 23.

The drier D comprises a pair of side air-blower nozzles 27 opened inwardly at opposite sides of the gate-type frame 2, and a top air-blower nozzle 28 opened downwardly at an upper portion of the gate-type frame 2, these air-blower nozzles 27 and 28 being connected to an air blower 29. The top air-blower nozzle 28 is operable for raising or lowering movement by lift-drive means (now shown) depending upon the level of the vehicle to be dried.

The cleaner spraying device C comprises a plurality of spray nozzles 47 provided in a cleaner supply header 46 mounted on the gate-type frame 2, and the wax applicator W comprises a plurality of spray nozzles 49 provided in a wax supply header 48 mounted on the gate-type frame 2.

Such rotary brush arrangement B, dryer D, cleaner spraying device C and wax applicator W are those conventionally provided on the known car washing machine, and their constructions are also well known.

Here, to provide the car washing machine 1 with a function of removing the aged wax and fur, first and second aged-wax/fur removing material spreaders M1 and M2 are mounted on the gate-type frame 2 in front and rear of the rotary brush arrangement B to sandwich the latter therebetween, and a neutralizer-containing rinse water sprayer R1 and the dryer D are mounted on the front portion of the gate-type frame 2 in close vicinity to the first aged-wax/fur removing material spreader M1. In addition, a clear water sprayer R2 is mounted on the rear portion in close vicinity to the second aged-wax/fur removing material spreader M2.

Figure 2:
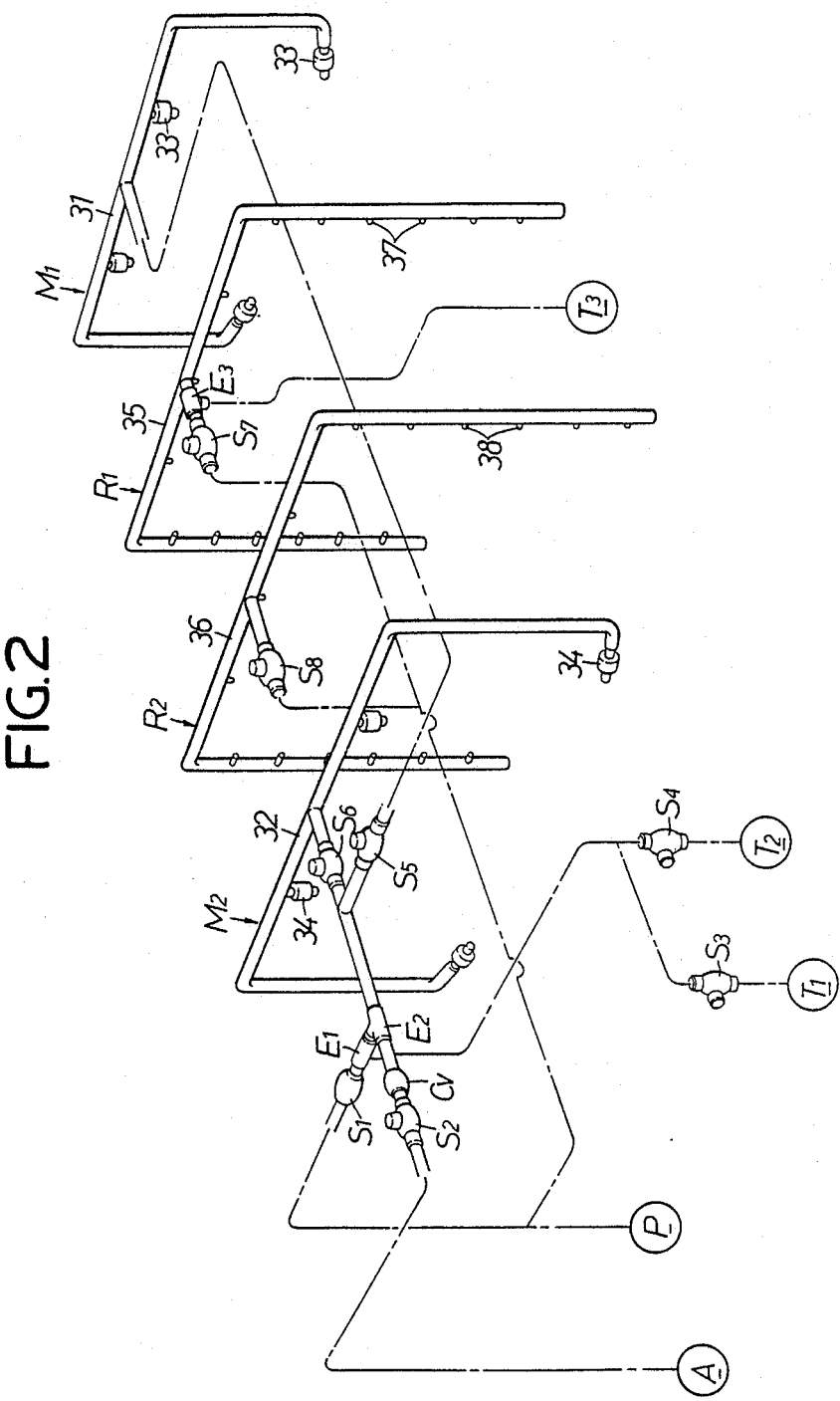
FIG. 2 is a perspective view illustrating a piping system for aged-wax/fur removing material spreaders, a clear water sprayer and a neutralizer-containing rinse water sprayer.
Figure 3A:
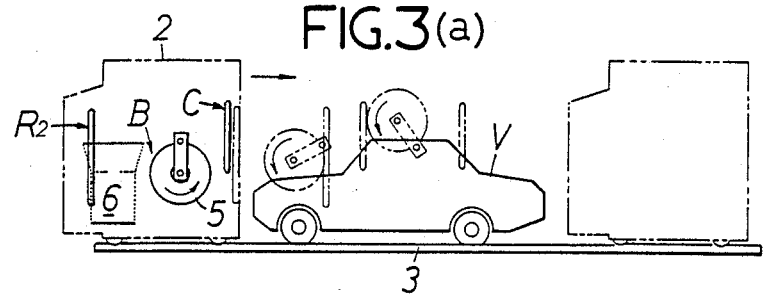
FIGS. 3 to 8 are views for illustrating operated conditions in sequence, FIGS. 3(a) to 8(a) being schematic side views and FIGS. 3(b) to 8(b) being schematic plan views.
Figure 3B:
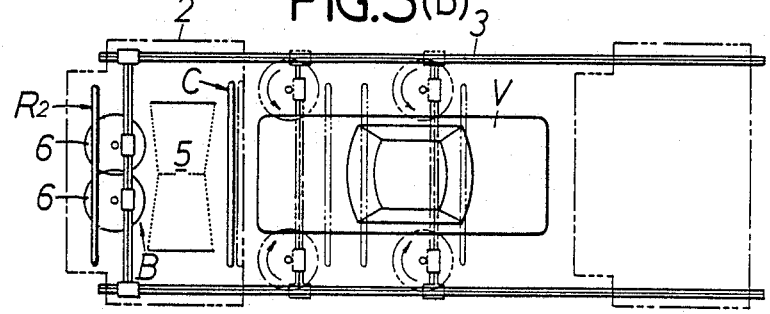

Referring to FIG. 2, each of the aged-wax/fur removing material spreaders M1 and M2 comprises a plurality of spreader nozzles 33, 34 faced to a vehicle (not shown) and attached to a gate-type supply header 31, 32 supported within the gate-type frame 2. The spreader nozzles 33 and 34 are attached respectively to the supply headers 31 and 32 in such a manner that the spreading direction thereof may be adjusted and moreover, opened areas thereof are set at a relative large value. Each of the neutralizer-containing rinse water sprayer R1 and the clear water sprayer R2 comprises a plurality of spray nozzles 37, 38 faced to the vehicle and attached to a gate-type supply header 35, 36 supported within the gate-type frame 2.

Connected to the aged-wax/fur removing material spreaders M1 and M2 are a water supply pump P, an air source A, an aged-wax/fur removing material reservoir tank T1 and an undercoating-wax reservoir tank T2. More specifically, a first solenoid valve S1 and a first ejector E1 are connected to the water supply pump P, and a second solenoid valve S2, a reducing valve Cv and a second ejector E2 are connected to the air sourse A. The first ejector E1 is perpendicularly connected to the second ejector E2. A third solenoid valve S3 is connected to the aged-wax/fur removing material reservoir tank T1, and a fourth solenoid valve S4 is connected to the undercoating-wax reservoir tank T2, these solenoid valves being in parallel and perpendicularly connected to the first ejector E1. Further, the second ejector E2 is connected through a fifth solenoid valve S5 to a central upper portion of the supply header 31 in the first aged-wax/fur removing material spreader M1 and also through sixth solenoid valve S6 to a central upper portion of the supply header 32 in the second aged-wax/fur removing material spreader M2.

The water supply pump P is connected through a seventh solenoid valve S7 and a third ejector E3 to a central upper portion of the supply header 35 to supply water to the neutralizer-containing rinse water sprayer R1 and also through a eighth solenoid valve S8 to a central upper portion of the supply header 36 to supply water to the clear water sprayer R2. In addition, a neutralizer reservoir tank T3 is perpendicularly connected to the third ejector E3.

An aged-wax/fur removing material stored in the aged-wax/fur removing material reservoir tank T1 acts on the aged wax and the fur to facilitate removal thereof from the coated surface and is a strong alkaline solution containing an anionic surfactant, a nonionic surfactant, chelating agent, an alkali salt and a solvent of glycol ether (an ethylene glycol monoalkyl ether is used in the embodiment). As described hereinafter, the solution is diluted at a pH of 12 to 14 with water and mixed with air in the aged-wax/fur removing material spreaders M1 and M2 and then spreaded over the coated surface in a bubbled form. Because the aged-wax/fur removing material is water-soluble, a neutralizing step and a rinsing step which are described hereinafter can be easily and reliably carried out, and it is also possible to immediately proceed to a step of spreading the aged-wax/fur removing material without incorporation of a drying step subsequent to a predrying step (during a first advancing movement).

For the neutralizer stored in the neutralizer reservoir tank T3, use is made of an acid exhibiting a pH of 4.5 to neutralize the alkaline aged-wax/fur removing material (preferably, an organic acid having a less effect of corroding a metal). Such neutralizer is sprayed from the neutralizer-containing rinse water sprayer R1 in the form of a liquid of a pH of 4.5 to 5.0 resulting from the mixing with clear water.

The operations of such rotary brush arrangement B, dryer D, cleaner spraying device C, wax applicator W, neutralizer-containing rinse water sprayer R1, clear water sprayer R2 and first and second aged-wax/fur removing material spreaders M1 and M2, as well as the travelling of the gate-type frame 2 are controlled by a control device 39 mounted on the gate-type frame 2 (see Fig. 1).

The operation of this embodiment will be described below with reference to FIGS. 3 to 8, wherein FIGS. 3(a) to 8(a) given at the upper side illustrate schematic side views, and FIGS. 3(b) to 8(b) given at the lower side illustrate schematic plan views, respectively.

During First Advancing Movement

In removing the aged wax and fur on the surface of a vehicle V, a start key (not shown) of the control device 39 for an aged-wax/fur removing step is depressed. This causes the gate-type frame 2 to advance as indicated by an arrow in FIG. 3. During this advancing movement, only the eighth solenoid valve S8 among the solenoid valves S1 to S8 is maintained in an opened condition, and the rotary brush arrangement B and the cleaner spraying device C are operated. Thus, the conventionally well-known brushing is applied to the surface of the vehicle, and clear water is sprayed thereon from the clear water sprayer R2, thereby removing the foulings on the vehicle surface such as mud other than the fur and the aged wax. If the temperature of the vehicle surface is too high, then the cooling effect can also be achieved by the water.

During First Returning Movement

Figure 4A:
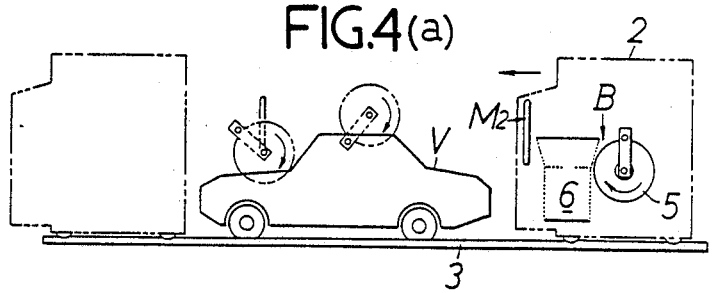
Figure 4B:
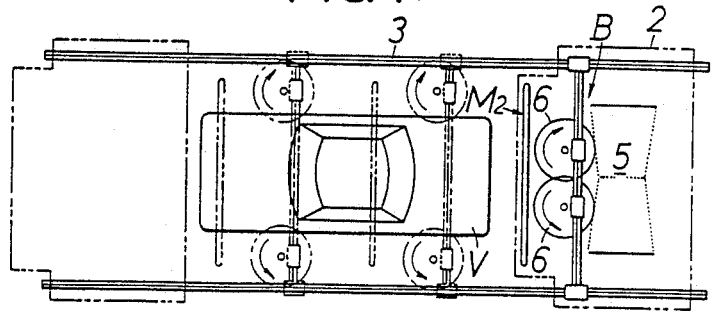

Then, the gate-type frame 2 is returned as indicated by an arrow in FIG. 4. During this returning movement, the first, second, third and sixth solenoid valves S1, S2, S3 and S6 are opened, while the fourth, fifth, seventh and eighth solenoid valves S4, S5, S7 and S8 are maintained closed, and the rotary brush arrangement B is driven. Thus, water from the water supply pump P, with the aged-wax/fur removing material drawn thereinto in the first ejector E1, is passed into the second ejector E2 where the resulting mixture is transformed into a bubbled form by air from the air sourse A. The bubbled aged-wax/fur removing material is supplied to the supply header 32 of the second aged-wax/fur removing material spreader M2 and then spreaded in the bubbled form through the individual spreader nozzles 34 toward the vehicle V. In this case, since the opened area of each nozzle 34 is set at a relative large value, the aged-wax/fur removing material is deposited onto the surface of the vehicle V without breaking of the bubbles therein. The spreading of the aged-wax/fur removing material transformed into the bubbled form is for preventing the removing material spreaded on the surface of the vehicle from immediately flowing down and for assuring a reaction time required for rising of the fur from the surface of the vehicle V to provide a uniform treatment surface. The experiments have showed that the transformation into the bubble form made it possible to provide a more excellent removal effect than the case where the removing material was spreaded merely in the form of a liquid.

The brushing performed simultaneously with the spreading of the aged-wax/fur removing material by the the rotary brush arrangement B provides an effect similar to that provided by manual rubbing-off and enables the removing material spreaded toward the vehicle V to be substantially uniformly deposited onto the entire surface of the vehicle V.

During Second Advancing Movement

Subsequently, the gate-type frame 2 is advanced as indicated by an arrow in FIG. 5. During this advancing movement, the sixth solenoid valve S6 is closed, and the fifth solenoid valve S5 is opened. This causes the aged-wax/fur removing material to be supplied in the bubbled form from the first aged-wax/fur removing material spreader M1 toward the vehicle V, and further, brushing by the rotary brush arrangement B is conducted. In this manner, the aged-wax/fur removing material is sufficiently spreaded onto the surface of the vehicle V with travelling of the gate-type frame 2 in one reciprocating movement thereof.

Figure 5A:
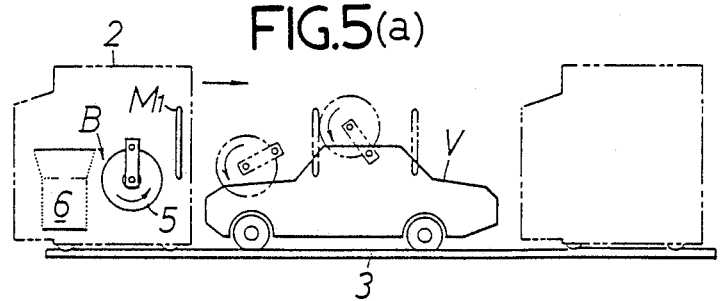
Figure 5B:
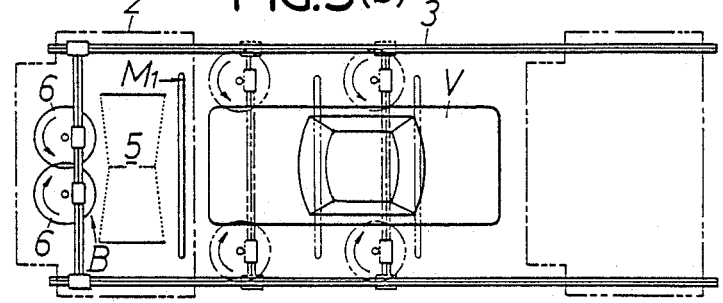

When the gate-type frame 2 has reached the right end shown in FIG. 5, the first, second, third and fifth solenoid valves S1, S2, S3 and S5 are closed. That is, all the solenoid valves S1 to S8 are brought into their closed states to complete the spreading of the aged-wax/fur removing material.

During Returning Movement

Figure 6A:
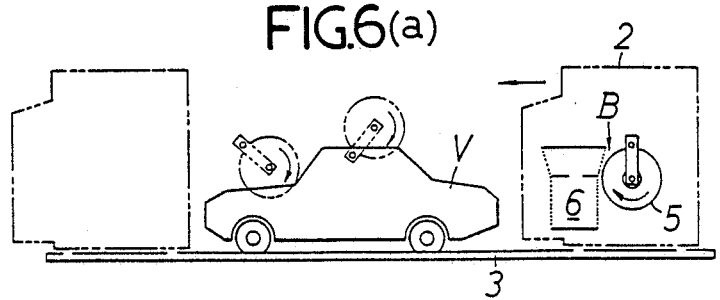
Figure 6B:
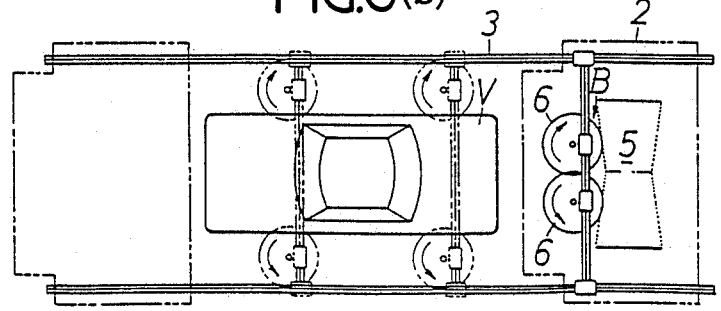
Figure 7A:
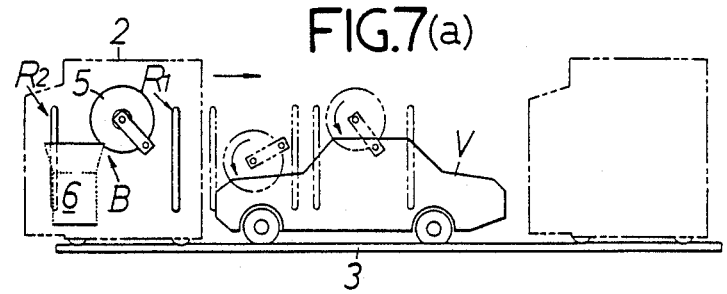
Figure 7B:
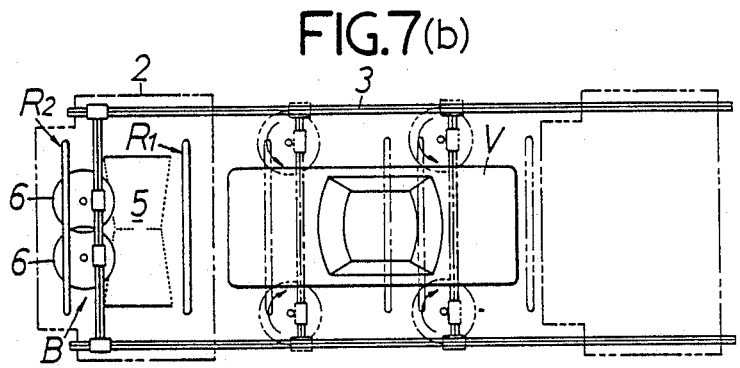
Figure 8A:
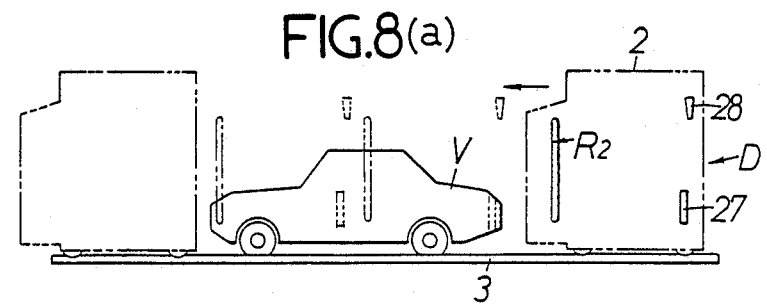
Figure 8B:
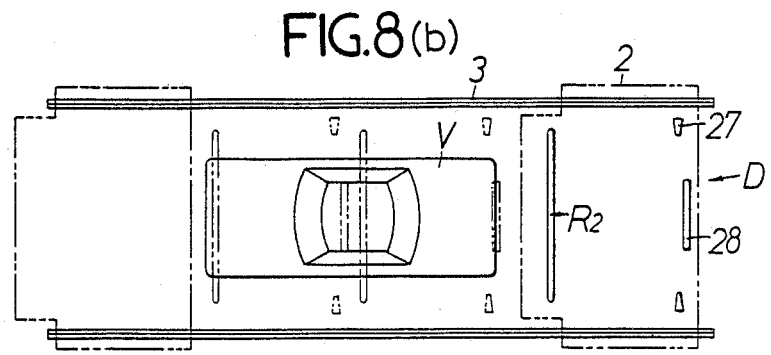

After spreading of the removing material, the gate-type frame 2 is returned as indicated by an arrow in FIG. 6. During this second returning movement of the gate-type frame 2, only the rotary brush arrangement B is in operation, so that the aged wax and fur still remaining not removed are removed off completely owing to passage of a sufficient period of time for reaction and by brushing operation.

Cessation Period

When the gate-type frame 2 has been returned to the left end shown in FIG. 6, the operation of the rotary brush arrangement B is ceased, and the gate-type frame is held out of operation for a given period of time, e.g., for 5 minutes. During such cessation, those portions of the vehicle surface which are difficult to be brushed by the arrangement B are manually readjusted for brushing.

During Third Advancing Movement

After cessation of the gate-type frame 2, start keys (not shown) of the control device 39 for rinsing and drying steps are depressed. This causes the gate-type frame 2 to advance as indicated by an arrow in FIG. 7. During this third advancing movement of the gate-type frame 2, the seventh and eighth solenoid valves S7 and S8 are opened, while the first to sixth solenoid valves S1 to S6 are maintained closed, and the rotary brush arrangement B is driven. After the neutralizer-containing rinse water has been sprayed from the neutralizer-containing rinse water sprayer R1 toward the vehicle V, the surface of the vehicle V is thereby subjected to brushing, and clear water is then sprayed from the clear water sprayer R2 toward the vehicle V. In this way, the neutralizer-containing rinse water sprayed from the neutralizer-containing rinse water sprayer R1 is brought fully into contact with all over the vehicle surface due to a brushing effect, so that the vehicle surface is effectively neutralized and then, any extra removing material, the aged wax and fur risen up and the like are washed off from the surface of the vehicle V by the clear water from the clear water sprayer R2. Namely, a first rinsing is effected to the vehicle surface. It should be noted that by setting each of nozzles 37 and 38 of the sprayers R1 and R2 at a small opening size and mounting them in an increased number, it is possible to spray the neutralizer-containing rinse water and clear water onto all over the surface of the vehicle V. Alternately, the third advancing step may be automatically started by timer means operated at the end of the second returning step, rather than being started by manually operating the start keys as described above.

During Third Returning Movement

Then, the gate-type frame 2 is returned as indicated by an arrow in FIG. 8. During this third returning movement, the seventh solenoid valve S7 is closed, while the eighth solenoid valve S8 is opened, and the dryer D is operated. This causes clear water to be sprayed from the clear water sprayer R2 toward the vehicle V, so that a second rinsing is effected to the surface of the vehicle V. Because the foulings and the fur on the surface of the vehicle V have been already removed at this point, the rotary brush arrangement B remains ceased in order to avoid damaging of the coated surface. The surface of the vehicle V washed by the clear water is dried by the dryer D. When the gate-type frame 2 has reached the left end shown in FIG. 8, the eighth solenoid valve S8 is closed, and the operation of the dryer D is ceased, thereby completing a series of the aged-wax and fur removing steps.

Waxing Step

Then, a manual waxing or a wax-cleaning by the conventionally well-known car-washing machine 1 is conducted as required.

During the second advancing and returning movements of the gate-type frame 2 in the aged-wax and fur removing steps, if the travelling speed of the gate-type frame 2 is reduced to a level lower than that during the first advancing movement by a hertz inverter (not shown) mounted, for example, within the control device 39, a brushing effect can be further enhanced, and the aged wax and fur can be removed to such a level as requiring no brush-readjustment work.

To notify a worker of a time for readjustment after cessation of the gate-type frame 2, an alarm device such as a buzzer 50 may be mounted on the gate-type frame 2 above the control device 39, as shown in FIG. 1.

What is claimed is:

1. A method for removing an aged wax and fur on a vehicle by a washing machine including a gate-type frame which is reciprocally travellable astride the vehicle in longitudinal directions of the vehicle and which is provided with a rotary brush arrangement, a dryer, a clear water sprayer, a neutralizer-containing rinse water sprayer and an aged-wax/fur removing material spreader, comprising the steps of:

brushing the vehicle by said rotary brush arrangement during a first advancing movement of the gate-type frame;

spreading an aged-wax/fur removing material onto the vehicle by said aged-wax/fur removing material spreader, while at the same time brushing the vehicle by said rotary brush arrangement during a first returning movement and second advancing movement of the gate-type frame;

brushing the vehicle by said rotary brush arrangement during a second returning movement of the gate-type frame;

putting the gate-type frame out of operation for a given period of time to perform a readjustment of the brushing during said period of out-of-operation;

spraying a neutralizer-containing rinse water onto the vehicle by said neutralizer-containing rinse water sprayer, while brushing the vehicle by said rotary brush arrangement, and then spraying clear water onto the vehicle by said clear water sprayer, during a subsequent third advancing movement of the gate-type frame; and spraying clear water onto the vehicle by said clear water sprayer and then drying the vehicle by said dryer during a third returning movement of the gate-type frame.

2. A method for removing an aged-wax and fur on a vehicle according to claim 1, wherein a cleaner spraying device mounted on said gate-type frame is operated during brushing in the course of said first advancing movement.

3. An aparatus for removing an aged-wax and fur on a vehicle, comprising as components:

a gate-type frame reciprocally travellable astride the vehicle in longitudinal directions of the vehicle;

a rotary brush arrangement mounted on said gate-type frame for brushing the vehicle;

first and second aged-wax/fur removing material spreaders mounted on said frame for spreading an aged-wax/fur removing material in a bubbled form onto the vehicle;

a neutralizer-containing rinse water sprayer mounted on said frame for spraying a neutralizer-containing rinse water onto the vehicle;

a clear water sprayer mounted on said frame for spraying clear water onto the vehicle;

a dryer mounted on said frame for drying the vehicle; and a control device for controlling travelling of said frame and operations of said individual components, said first and second aged-wax/fur removing material spreaders being arranged in front and rear of said rotary brush arrangement respectively, so as to sandwich the rotary brush arrangement therebetween, said neutralizer-containing rinse water sprayer and said dryer being disposed at front portions of said gate-type frame, respectively, and said clear water sprayer being disposed at a rear portion of said gate-type frame.

* * * * *